Patented Sept. 10, 1929.

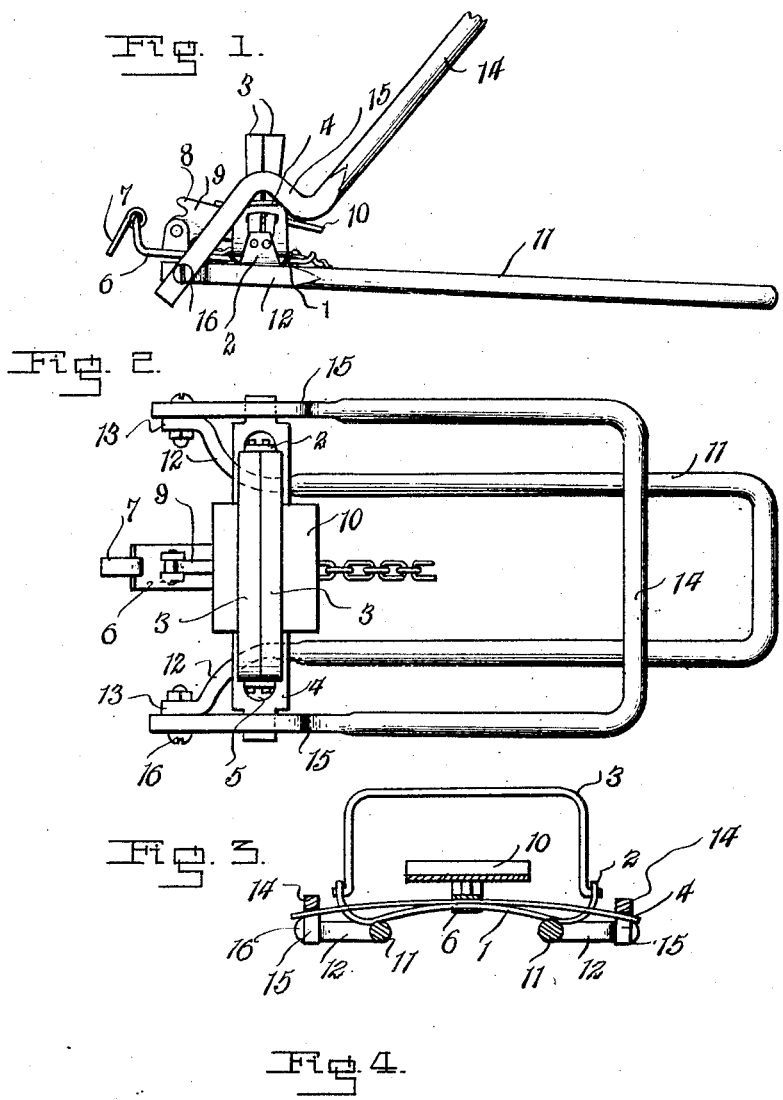
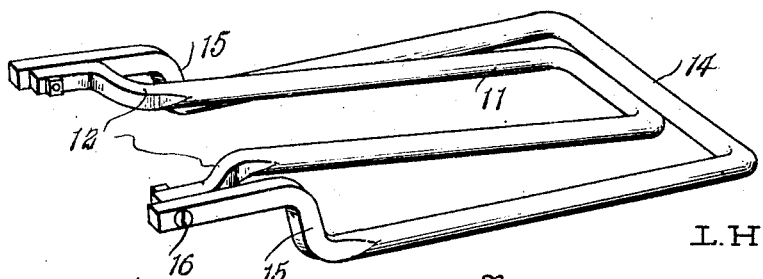

1,727,773

UNITED STATES PATENT OFFICE.

LLOYD HOOVER, OF KARTHAUS, PENNSYLVANIA.

TRAP SETTER.

Application filed August 25, 1927. Serial No. 215,452.

This invention is a device by the use of which a spring trap may be set without danger to the trapper and wherever the trapper may be and upon loose or soft soil. It is now the general practice to set spring traps prior to placing them for operation and by pressing upon the jaws of the trap so as to spread them apart. This practice requires that the trap be placed upon a hard or unyielding surface and there is always danger of the trap being accidentally sprung while being carried to the place where it is to operate, many serious accidents being due to this cause. My invention provides a simple device whereby the trap may be easily set anywhere and without danger to the trapper. The invention is illustrated in the accompanying drawing and will be hereinafter fully set forth.

In the drawing:

Figure 1 is a side elevation of my trap-setting device showing the same applied to a trap and in the initial position;

Fig. 2 is a plan view of the same;

Fig. 3 is a transverse section illustrating more particularly the manner in which the trap is disposed relative to the setter for operation, and Fig. 4 is a detail perspective view of the setter removed from the trap.

The trap illustrated in the accompanying drawing is of well-known construction comprising a base member 1 having upturned ends 2 in which the jaws 3 are pivotally mounted so as to swing toward or from each other. Carried by the base member 1 is a strong spring plate 4, the ends of which normally extend upwardly, as shown in Fig. 1, and are provided with openings 5 fitting around the end portions of the jaws so that the jaws will be held together in the position shown in Figs. 1 and 2. An arm 6 extends laterally from the base member 1 and the free end of this arm is upturned to support a latch 7 which, when the trap is set, extends over one of the open jaws to engage in a notch 8 in the rear end of a trigger 9 which is pivotally mounted upon the arm 6, the said trigger carrying a plate or pan 10 which will be exposed between the jaws when the jaws are opened. When the trap is set, the spring 4 has its ends flexed downwardly, as shown in Fig. 3, so that the jaws are free of the spring and may be swung downwardly to horizontal or substantially horizontal positions, one of the jaws passing under the latch 7 which is then engaged with the notch 8 and by said engagement will retain the jaws in the lowered position. If an animal should then step on the pan or plate 10, the weight of the animal will release the trigger from the latch, whereupon the spring at once flexes upwardly and closes the jaws about the foot of the animal.

In setting the trap, it is necessary to exert considerable pressure upon the jaws to overcome the force of the spring and to hold the jaws against closing while the trigger and latch are being engaged. The present invention provides very simple and efficient means for accomplishing this result. The device of the invention comprises a U-shaped lever 11 having its end portions curved outwardly, as shown at 12, and having parallel terminals 13. The device also includes a second U-shaped lever 14 which has its side members spaced apart a greater distance than the sides of the lever 11 and offset, as at 15, at right angles to the plane of the lever, the free ends of the two levers being pivotally connected by bolts 16, as shown. In using the setter, the inner lever 11 is placed upon the ground, as shown in Fig. 1, and the ends of the base member 1 of the trap are placed upon the outwardly turned divergent portions 12 of the same to be supported thereby as will be understood upon reference to the drawing. The outer wider lever 14 is then brought over the ends of the spring 4, as shown in Figs. 1, 2 and 3, and swung downwardly toward the inner lever 11, the swinging movement of the lever 14 causing the offsets 15 thereof to engage the free ends of the spring and flex the same downwardly, as will be understood upon reference to Fig. 3. It will be noted particularly on reference to Fig. 1 that the offsets 15 constitute angular seats to engage the ends of the spring and prevent it from twisting and slipping from the lever so that it will be effectually held. The jaws will thus be relieved of the tension of the trap spring and the trapper by pressing upon the free end of the lever 14 may hold the setter in the position shown in Figs. 2 and 3, thereby retaining the spring in its downwardly flexed position while leaving a hand free to set the trap. By then reaching under the jaws 3, he may easily and safely swing them apart so that one of the jaws will pass between the trigger and the latch, whereupon the latch may be swung over the adjacent jaw and engaged with the trigger, the tension of the spring being then exerted upwardly against the pan 10 and the trigger so that the jaws will be held open. All the trapper then has to do is to swing the lever 14 in a reverse direction, whereupon the base lever 11 may be easily slid from under the trap. It will be seen at once that the inner lever constitutes a base plate providing a firm support for the trap while it is being set and the operating lever 14 provides means whereby sufficient pressure to overcome the trap spring may be easily applied so that the trap can be set wherever the trapper desires to place it without regard to the nature of the ground where the trap is to be put. The device is exceedingly simple and inexpensive and is highly efficient.

Having thus described the invention, I claim:

A trap setter comprising a U-shaped member having divergent end portions in the plane of the member to support a trap, and a second U-shaped member having its ends pivoted to the outer sides of the ends of the first-mentioned member, the sides of the second-mentioned member being offset at an angle to the plane of the member adjacent the ends thereof to engage the spring of a trap supported by the first-mentioned member whereby to flex the spring and permit the jaws of the trap to be manually opened.

In testimony whereof I affix my signature.

LLOYD HOOVER. [L. S.]